United States Patent
Tamaribuchi et al.

(10) Patent No.: US 11,441,716 B2
(45) Date of Patent: Sep. 13, 2022

(54) RESIN PIPE JOINT, PIPING, AND PIPING PRODUCTION METHOD

(71) Applicant: MIRAIAL CO., LTD., Tokyo (JP)

(72) Inventors: Seiya Tamaribuchi, Tokyo (JP);
Makoto Yokoyama, Tokyo (JP)

(73) Assignee: MIRAIAL CO., LTD., Tokyo (JP)

( * ) Notice: Subject to any disclaimer, the term of this patent is extended or adjusted under 35 U.S.C. 154(b) by 337 days.

(21) Appl. No.: 15/771,721

(22) PCT Filed: Oct. 28, 2015

(86) PCT No.: PCT/JP2015/080443
§ 371 (c)(1),
(2) Date: Apr. 27, 2018

(87) PCT Pub. No.: WO2017/072888
PCT Pub. Date: May 4, 2017

(65) Prior Publication Data
US 2018/0340641 A1   Nov. 29, 2018

(51) Int. Cl.
*F16L 41/02* (2006.01)
*F16L 47/02* (2006.01)
*F16L 47/32* (2006.01)

(52) U.S. Cl.
CPC .............. *F16L 41/021* (2013.01); *F16L 47/02* (2013.01); *F16L 47/32* (2013.01)

(58) Field of Classification Search
CPC ......... F16L 41/021; F16L 47/32; F16L 47/02; F16L 43/008; F16L 47/26
(Continued)

(56) References Cited

U.S. PATENT DOCUMENTS

| 4,070,044 A | 1/1978 | Carrow |
| 4,629,218 A | * 12/1986 | Dubois .................. E21B 17/20 |
| | | 138/155 |

(Continued)

FOREIGN PATENT DOCUMENTS

| DE | 102006034697 A1 * | 2/2007 | .............. F16L 47/32 |
| JP | H05256391 | 10/1993 | |

(Continued)

OTHER PUBLICATIONS

International Preliminary Report on Patentability on corresponding PCT application (PCT/JP2015/080443) from International Preliminary Examining Authority (JPO) dated Jan. 30, 2018.

(Continued)

*Primary Examiner* — James M Hewitt, II
(74) *Attorney, Agent, or Firm* — Klein, O'Neill & Singh, LLP (57) ABSTRACT

A resin pipe joint (1, 11) includes a tubular joint body portion (2, 12) defining an internal flow path (P) the internal flow path being configured to allow a fluid to flow therein; and two or more welding end portions (3-3c, 13a, 13b) respectively provided at two or more opening portions (A1-A3) of the internal flow path (P), each of the welding end portions being configured to be welded to an abutting welding end portion of other resin piping member, wherein the internal flow path (P) comprises: one of a branched point (Bp) that branches the internal flow path (P) into two or more portions; a curved point (Cp) that bends the internal flow path (P); and an internal diameter transition point (Tp) that changes an internal diameter of the internal flow path, in mid-way of the internal flow path, and wherein a length (Lh) from the branched point (Bp), the curved point (Cp) or the inner diameter transition point (Tp) to an end face of the welding end portion (3-3c, 13a, 13b) is shorter than half of a straight distance (SD, SD1-SD4) between two points (Continued)

adjacent to each other, the two points being selected from the group consisting of branched points (Bp), curved points (Cp) and inner diameter transition points (Tp) of piping to be formed using the resin pipe joints (1, 11).

5 Claims, 8 Drawing Sheets (58) Field of Classification Search
USPC .................................. 285/133.11, 133.3, 179
See application file for complete search history.

(56) References Cited

U.S. PATENT DOCUMENTS

| | | | |
|---|---|---|---|
| 5,090,743 | A | 2/1992 | Obering |
| 5,156,420 | A | 10/1992 | Bokor et al. |
| 5,316,349 | A * | 5/1994 | Rafeld .................... F16L 47/32 285/133.3 |
| 5,452,922 | A | 9/1995 | Ziu |
| 5,775,736 | A * | 7/1998 | Svetlik .................... F16L 47/00 285/133.5 |
| 5,975,590 | A | 11/1999 | Cowan et al. |
| 6,203,071 | B1 | 3/2001 | Kingsford et al. |
| 2009/0243284 | A1 | 10/2009 | Klingel, Jr. et al. |
| 2010/0133804 | A1 | 6/2010 | Larkin |
| 2011/0074145 | A1* | 3/2011 | Schwarzkopf ...... B29C 66/1288 285/21.2 |
| 2014/0020811 | A1 | 1/2014 | Wermelinger |
| 2014/0069548 | A1 | 3/2014 | Hasegawa |
| 2016/0018037 | A1 | 1/2016 | Nichols et al. |
| 2016/0153599 | A1* | 6/2016 | Yokoyama ............. B23K 31/02 285/133.11 |
| 2017/0307124 | A1 | 10/2017 | Svetlik |

FOREIGN PATENT DOCUMENTS

| | | |
|---|---|---|
| JP | H07156276 | 6/1995 |
| JP | H1194176 | 4/1999 |
| JP | 2001253950 A | 9/2001 |
| JP | 2003097766 | 4/2003 |
| JP | 2003247687 | 9/2003 |
| JP | 2006177513 | 7/2006 |
| JP | 2006266397 | 10/2006 |
| JP | 2007078069 | 3/2007 |
| JP | 2014025575 | 2/2014 |

OTHER PUBLICATIONS

International Search Report on corresponding PCT application (PCT/JP2015/080443) from International Searching Authority (JPO) dated Jan. 19, 2016.
International Search Report on co-pending PCT application (PCT/JP2015/077624) from International Searching Authority (JPO) dated Dec. 22, 2015.
International Preliminary Report on Patentability on co-pending PCT application (PCT/JP2015/077624) from International Preliminary Examining Authority (JPO) dated Sep. 19, 2017.

* cited by examiner

PRIOR ART

FIG. 8B

PRIOR ART

RESIN PIPE JOINT, PIPING, AND PIPING PRODUCTION METHOD

CROSS-REFERENCE TO RELATED APPLICATIONS

This application is a national phase entry, under 35 U.S.C. Section 371(c), of International Application No. PCT/JP2015/080443, filed Oct. 28, 2015. The disclosure of the International Application is incorporated herein by reference in its entirety. This application is related to co-pending U.S. application Ser. No. 15/763,983, filed Mar. 28, 2018.

FEDERALLY SPONSORED RESEARCH OR DEVELOPMENT

Not Applicable

TECHNICAL FIELD

This invention relates to a resin pipe joint comprising: a tubular joint body portion defining an internal flow path, the internal flow path being configured to allow a fluid to pass therein; and two or more welding end portions respectively provided at two or more opening portions of the internal flow path, wherein the internal flow path comprises: one of a branched point that branches into two portions in mid-way of the internal flow path; a curved point that bends in mid-way of the internal flow path; and an inner diameter transition point where the inner diameter changes in mid-way of the internal flow path, and to a method for producing the piping. More particularly, this invention proposes a technique capable of applying the resin pipe joint to piping having various shapes.

BACKGROUND ART

Piping such as chemical liquid transporting lines and the like utilized in various industries may be formed by welding an end portion(s) of a resin pipe joint(s) made of a thermoplastic resin or the like to end portions of resin tube members or other resin pipe joints or other resin piping members while butting the respective end portions against each other, using a welding machine.

More particularly, for example, each of the resin pipe joint and the resin piping member is held by each of a pair of clamp jigs of the welding machine in a posture where the end portion of the resin pipe joint and the end portion of the resin piping member are opposed to each other. Both of the end portions of the resin pipe joint and the resin piping member held by the clamp jigs are heated by a heater or other heating device to melt their end portions, and in this state, the resin pipe joint and the resin piping member or like are brought close to each other to butt their end portions against each other by applying a required pressure and weld them.

By sequentially connecting a plurality of resin piping members such as the resin pipe joint and the resin tube member by thus welding the end portions of them, piping having a predetermined shape can be manufactured.

SUMMARY OF INVENTION

Technical Problem

By the way, recently, reduction of the size or volume of the entire piping is required due to restrictions on the space where the piping is installed. So-called mechanical joints may be connected by means of bolts and nuts, but it causes an increase in the volume of piping. Therefore, in terms of reduction of the volume of piping, the resin pipe joints connected by welding of a resin as described above are more advantageous than those mechanical joints.

Under such circumstances, when there is a piping portion having a relatively short distance between two points selected from branched points, curved points and inner diameter transition points of two resin pipe joints adjacent to each other, in the piping to be produced using the resin pipe joints, the end portions of the resin pipe joint are cut in situ during the production of the piping to shorten the joint itself and subjected to a predetermined treatment on the cut end face. However, there is a problem that such working results in a decrease in production efficiency.

Figure 8A:
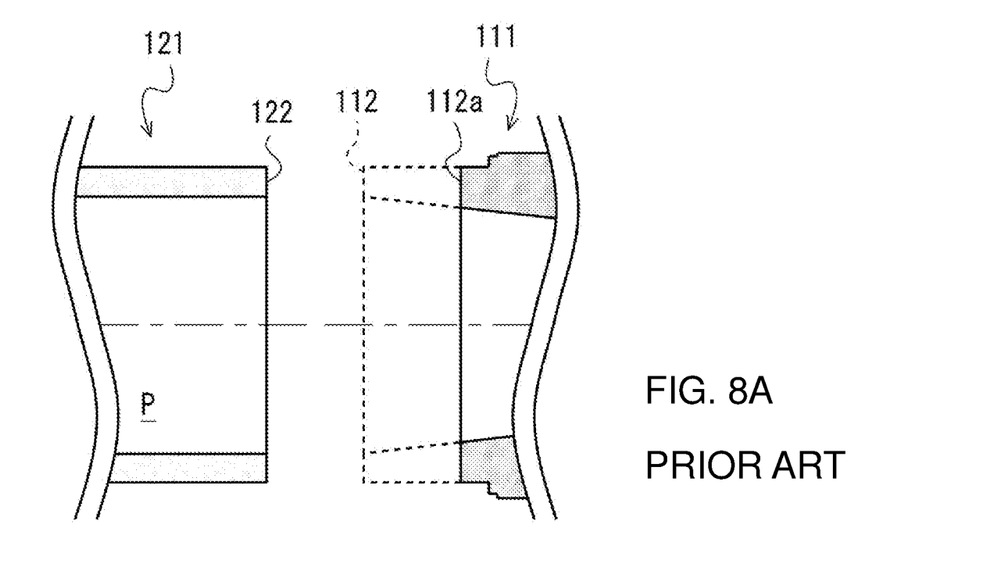
FIGS. 8A and 8B are cross-sectional views showing how an end portion of a conventional resin pipe joint is welded to other resin piping member.
Figure 8B:
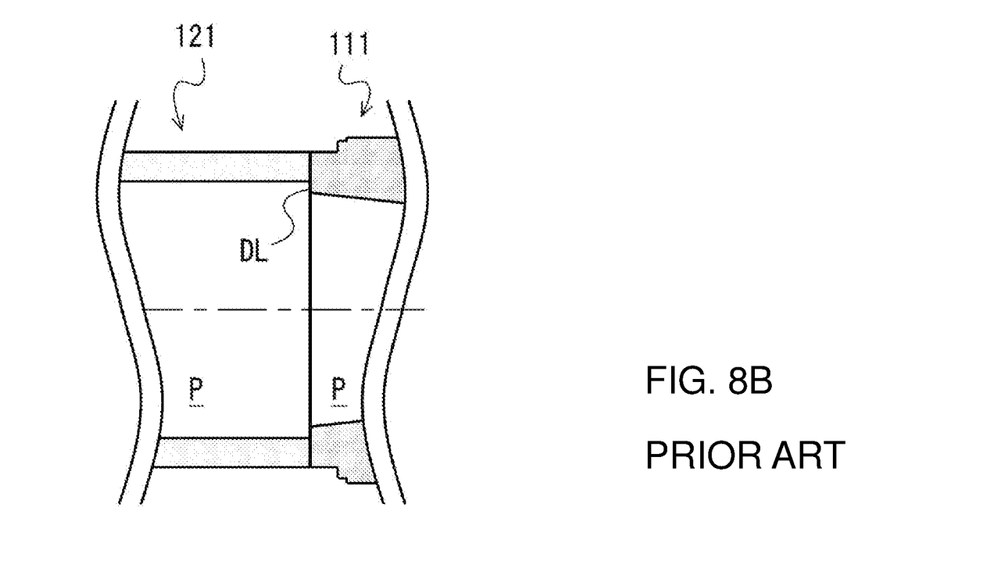

Further, in the case of a resin pipe joint 111 in which a cross-sectional area of an internal flow path P as shown in FIG. 8A is tapered so as to gradually increase toward a welding end portion 112 in view of ease of removal of core pins for forming the internal flow path when molding the resin pipe joint by injection molding, a pipe inner diameter of an end portion 112a of the resin pipe joint 111, when cutting the end portion 112a of the resin tube joint 111 for the reason as stated above, will become smaller than a pipe inner diameter of the original end portion 112, as shown by the broken lines in the figure. Therefore, there is also a problem that when the resin pipe joint 111 having the end portion 112 thus shortened is welded to the end portion 122 of the resin tube member 121 or the like, a step difference DL as shown in FIG. 8B is formed due to the difference in inner diameter, thereby resulting in a liquid pool and a decrease in the flow rate at the time of use.

It is an object of this invention to solve such problems. Thus, the object of this invention is to provide a resin pipe joint that is adaptable to piping having various shapes, without any work such as cutting of the end portion(s) of the resin pipe joint so as to coincide with a predetermined pipe shape; piping; and a method for producing the piping.

Solution to Problem

As a result of intensive studies, the inventors have found that a resin pipe joint having a dimension and shape in which a length from a branched point, a curved point or an inner diameter transition point to a welding end portion of the resin pipe joint is shorter than half of a distance between two points adjacent to each other, the two points being selected from branched points, curved points and inner diameter transition points of piping to be produced using the resin pipe joints, can eliminate any cutting work of the end portions of the resin pipe joint during the production of the piping.

Under such findings, this invention provides a resin pipe joint comprising: a tubular joint body portion defining an internal flow path, the internal flow path being configured to allow a fluid to flow therein; and two or more welding end portions respectively provided at two or more opening portions of the internal flow path, each of the welding end portions being configured to be welded to an abutting welding end portion of another resin piping member, wherein the internal flow path comprises: one of a branched point that branches the internal flow path into two or more portions; a curved point that bends the internal flow path; and an internal diameter transition point that changes an internal diameter of the internal flow path, in mid-way of the internal flow path, and wherein a length from the branched point, the curved point or the inner diameter transition point to an end face of the welding end portion is shorter than half of a straight distance between two points adjacent to each other, the two points being selected from the group consisting of branched points, curved points and inner diameter transition points of piping to be formed using the resin pipe joints. The straight distance between two points means a straight distance between two points in a piping portion in which the resin pipe joints are used. Preferably, the inner diameter of the welding end portion of the resin pipe joint is equal to an inner diameter of the abutting welding end portion of the other resin piping member to be welded to the welding end portion of the resin pipe joint.

In the resin pipe joint according to this invention, it is preferable that the length from the branched point, the curved point or the inner diameter transition point to the end face of the welding end portion is longer than half of a pipe outer diameter at the welding end portion. Further, in the resin pipe joint according to this invention, it is preferable that a ratio of the length from the branched point, the curved point or the inner diameter transition point to the end face of the welding end portion, to a pipe outer diameter at the welding end portion, is within a range of from 0.81 to 3.90.

This invention provides piping comprising a plurality of resin piping members including two or more resin pipe joints, wherein at least one of the resin pipe joints comprises any one of the resin pipe joints as described above.

It is preferable that the piping according to this invention comprises a resin pipe joint having a length from a branched point, a curved point or an inner diameter transition point to an end face of a welding end portion, wherein the length is shorter than half of the shortest straight distance between two points, among straight distances between two points adjacent to each other, the two points being selected from the group consisting of the branched points, curved points and inner diameter transition points of the piping.

It is preferable that in the piping according to this invention, a ratio of the shortest straight distance between two points, among straight distances between two points adjacent to each other, the two points being selected from the group consisting of branched points, curved points and inner diameter transition points of the piping, to a pipe outer diameter at the welding end portion of the resin pipe joint comprising the branched point, curved point or inner diameter transition point, is within a range of from 1.61 to 7.9.

Further, it is preferable that the piping according to this invention comprises a piping portion comprised of: two resin pipe joints including any of the resin pipe joints as described above; and a straight tubular resin piping member connected between the resin pipe joints, wherein a distance between two points selected from the group consisting of branched points, curved points and inner diameter transition points of each of the two resin pipe joints of the piping portion is the straight distance between two points adjacent to each other, the two points being selected from the group consisting of branched points, curved points and inner diameter transition points.

This invention provides a method for producing piping by connecting a plurality of resin piping members, the method comprising: preparing two resin piping members including at least one of the above-mentioned resin pipe joints, each of the two resin piping members comprising welding end portion that has same inner diameter; and welding the abutting welding end portions of each of the two resin piping members to connect the two resin piping members to each other.

Advantageous Effects of Invention

According to the present invention, piping having a predetermined shape can be produced without cutting any end portion of the resin pipe joint so that the resin pipe joint can be adapted to piping having various shapes, because the length from the branched point, the curved point or the inner diameter transition point to the end face of the welding end portion of the resin pipe joint is shorter than half of the straight distance between two points adjacent to each other, selected from the group consisting of the branched points, curved points and inner diameter transition points of the piping to be formed by using the resin pipe joint. Further, according to the resin pipe joint of this invention, it is not necessary to cut the end portions when welding the resin pipe joint to other piping members at their end portions, because the length from the branched point, the curved point or the inner diameter transition point to the end face of the welding end portion is shorter than half of the straight distance between the above two points. As a result, even if the resin pipe joint has a tapered internal flow path, it is possible to prevent generation of a step in the inner surface of the welded portion to the other resin pipe member, so that flow resistance of a fluid flowing through the internal flow path can be reduced as compared with that of a conventional pipe joint.

BRIEF DESCRIPTION OF DRAWINGS

FIGS. 4A, 4B, and 4C are schematic views respectively showing a piping portion that can be produced using resin pipe joints according to this invention or the like.

DESCRIPTION OF THE PREFERRED EMBODIMENTS

Figure 1A:
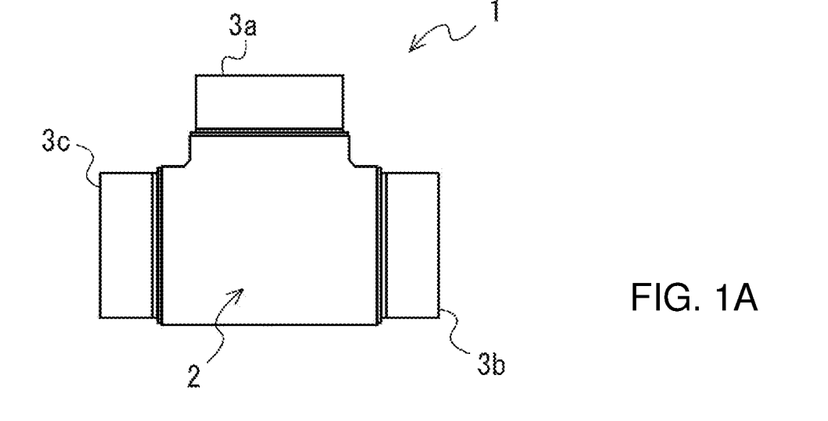
FIG. 1A is a plan view showing one embodiment of a resin pipe joint according to this invention and a cross-sectional view including central axis lines of an internal flow path.

Embodiments of this invention will be described in detail below with reference to the drawings. A resin pipe joint 1 illustrated in a plan view and a cross-sectional view in FIGS. 1A and 1B, respectively, can be referred to as a so-called Tee, and include a tubular joint body portion 2 having an internal flow path P with a T shape in the cross section shown in FIG. 1B; and welding end portions 3a-3c respectively provided at three opening portions A1-A3 of the internal flow path P. The joint body portion 2 having the T-shaped internal flow path P also has a substantially T-shaped outer shape as shown in FIG. 1A.

Figure 1B:
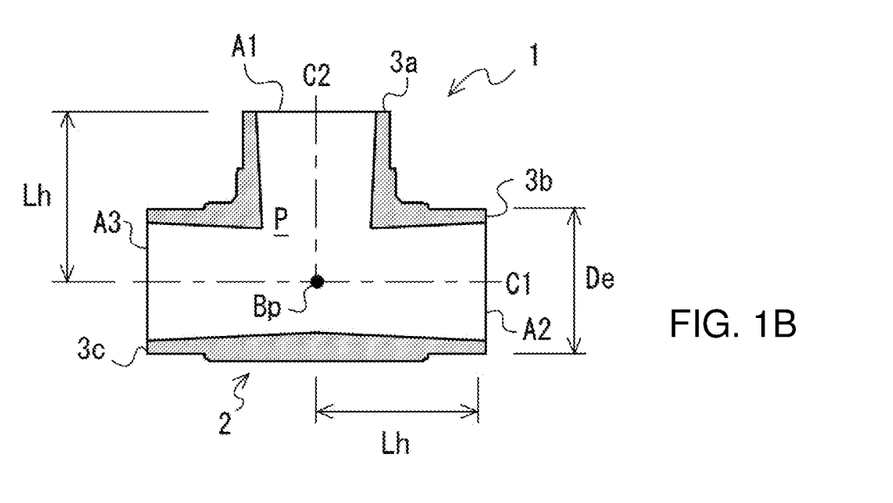
FIG. 1B is a cross-sectional view of the embodiment of FIG. 1A.

Here, when constructing piping as described below including the resin pipe joint 1, each of the welding end portions 3a-3c of the resin pipe joint 1 is welded to an abutting end portion of a resin tube member having a straight-pipe shape, curved pipe shape or the like or other resin pipe joint, by using a welding machine (not shown) or the like. The welding can be carried out, for example, by holding the resin pipe joint 1 and the resin tube member or the like on a pair of clamp jigs of the welding machine, in such a posture that the end portion of the resin pipe joint 1 and the end portion of the resin tube member or the like are opposed to each other, and then bringing the resin pipe joint 1 and the resin tube member or the like close to each other while heating both of the end portions of the resin pipe joint 1 and the resin tube member or the like held on the clamp jigs to melt them by a heater or other heating device and abutting their end portions against each other by applying a required pressure. Each of the welding end portions 3a-3c can provide a thickness of 1 mm or more as a welding margin.

Here, the internal flow path P in the joint body portion 2 generally has a circular flow path cross section and serves to allow a fluid, for example a liquid such as a chemical liquid or a gas or other fluid to flow therein so as to supply the fluid to a certain position, when using piping including the resin pipe joint 1. The internal flow path P according to the embodiment is composed of a base portion having a central axis line C1 linearly extending and a branched portion having a central axis line C2 vertically branching from the base portion at the center in mid-way of the extension of the base portion.

The resin pipe joint 1 has a branched point Bp that branches the internal flow path P into two portions at a position where the central axis line C1 of the base portion of the internal flow path P intersects with the central axis line C2 of the branched portion. In the illustrated resin pipe joint 1, the central axis line C1 of the base portion of the internal flow path P and the central axis line C2 of the branched portion intersect at a branched point Bp at an angle of 90°, but it may also be other resin pipe joints in which those central axis lines intersect at other angles.

Figure 2A:
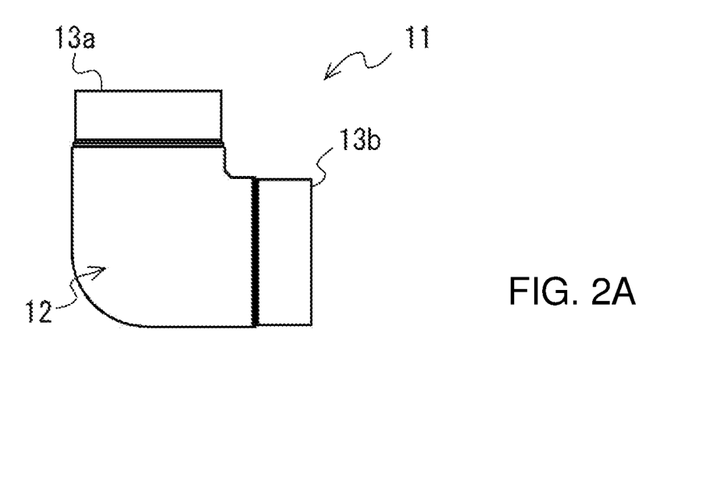
FIG. 2A is a plan view showing another embodiment of a resin pipe joint according to this invention and a cross-sectional view including central axis lines of an internal flow path.
Figure 2B:
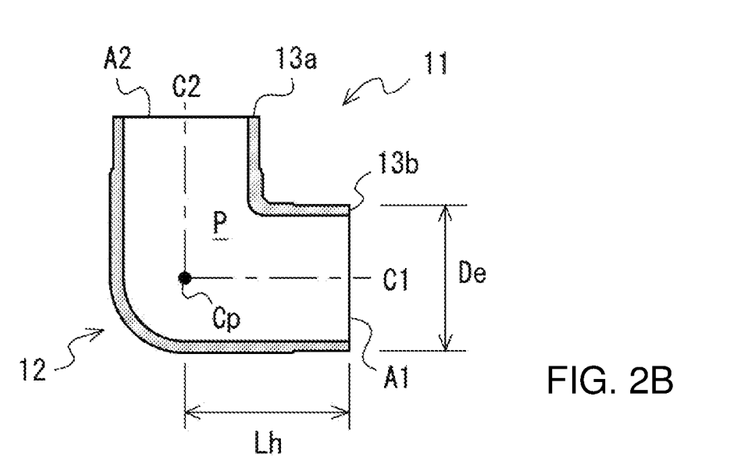
FIG. 2B is a cross-sectional view of the embodiment of FIG. 2A.

FIGS. 2A and 2B show a resin pipe joint 11 according to another embodiment. This resin pipe joint 11 can be referred to as a so-called elbow, and includes a joint body portion 12 in which both of the outer shape shown in FIG. 2A and the outer shape of the internal flow path P shown in FIG. 2B have a substantially L shape; and welding end portions 13a and 13b respectively provided at two opening portions A1 and A2 of the internal flow path P.

In this embodiment, the internal flow path P bends in the middle of its extension and has linear center axis lines C1 and C2 that intersect with each other at an angle of 90°. The resin pipe joint 11 has a curved point Cp that bends the internal flow path P, at a position where the two straight central axis lines C1 and C2 intersect with each other. It may also be a resin pipe joint having an internal flow path in which the central axis lines intersect at an angle other than 90°, although not shown.

Figure 3A:
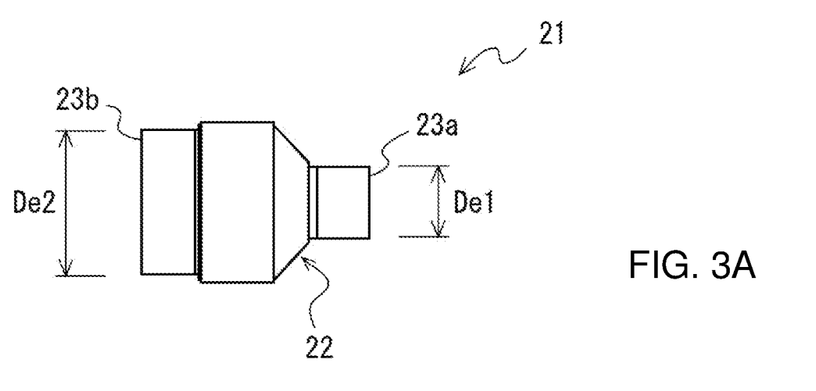
FIG. 3A is a plan view showing still another embodiment of a resin pipe joint according to this invention and a cross-sectional view including a central axis line of an internal flow path.
Figure 3B:
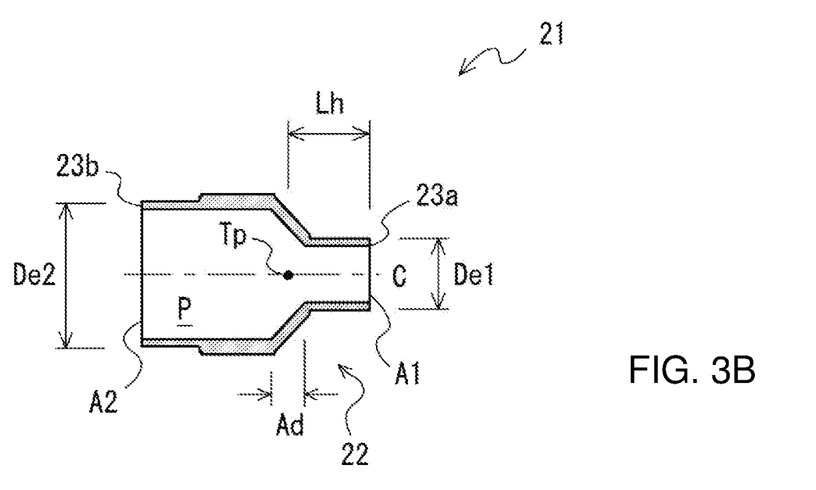
FIG. 3B is a cross-sectional view of the embodiment of FIG. 3A.

FIGS. 3A and 3B show a resin pipe joint 21 according to still another embodiment. The resin pipe joint 21 can be referred to as a so-called reducer and includes a joint body portion 22 defining an internal flow path P whose inner diameter changes in mid-way of the flow path; and welding end portions 23a and 23b respectively provided at two opening portions A1 and A2 of the internal flow path P.

In this embodiment, as shown in FIG. 3B, the inner diameter of the internal flow path P is linearly increased in the cross section shown in the figure, in the middle of the path from the welding end portion 23a on the right side of the figure to the welding end portion 23b on the left side, so that the welding end portions 23a and 23b have different inner diameters. Thus, the resin pipe joint 21 has an inner diameter transition point Tp at the central position in the direction of the center axis line C of the internal flow path P (the left-right direction in FIG. 3), in a region Ad in which the inner diameter changes.

It should be noted that the resin pipe joint having such an inner diameter transition point is not limited to the pipe joint shown in FIGS. 3A and 3B, and it may be, for example, a resin pipe joint having an internal flow path whose inner diameter changes in a curved shape as viewed in the cross section, although not shown.

Figure 4A:
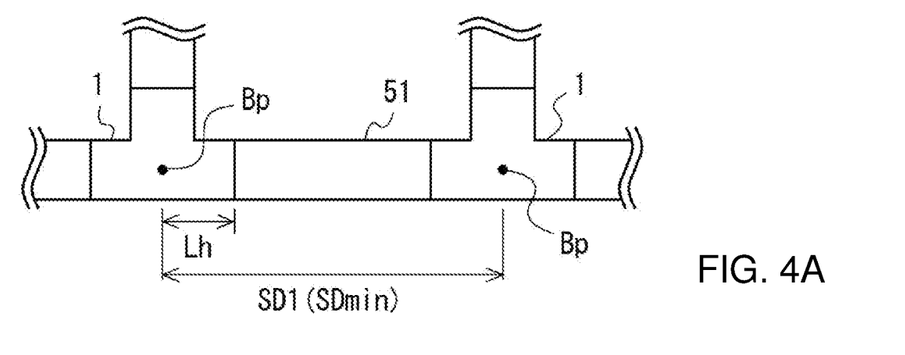
Figure 4B:
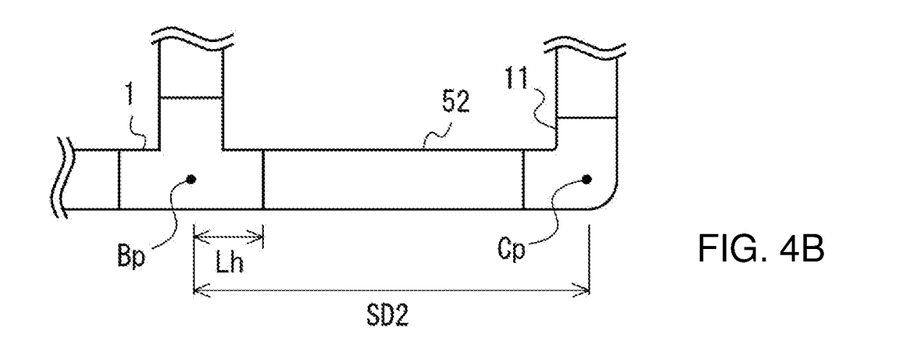
Figure 4C:
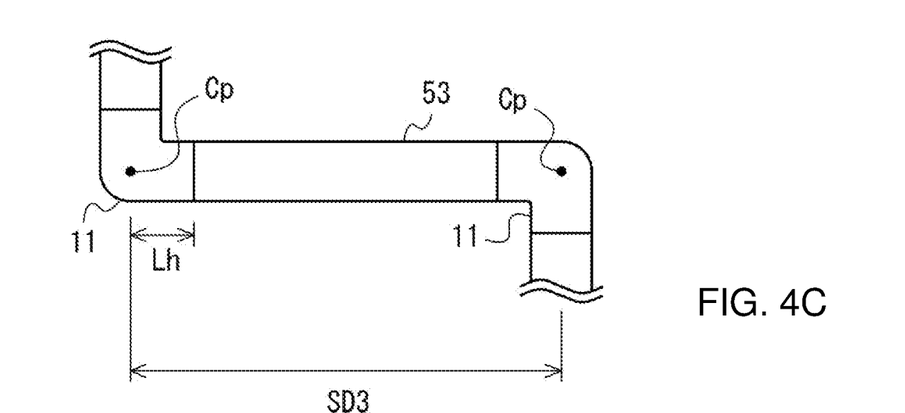

Piping having a piping portion as illustrated in FIGS. 4A, 4B, and 4C can be produced by welding a plurality of resin piping members including the resin pipe joints such as the resin pipe joints 1, 11, 21 as described above and the straight-pipe shaped resin tube members at their welding end portions as described above to sequentially connect them.

The piping portion shown in FIG. 4A is comprised of two resin pipe joints 1 shown in FIGS. 1A and 1B, and a straight-pipe shaped resin tube member 51 having a predetermined length, connected between these two resin pipe joints 1. The piping portion shown in FIG. 4B is comprised of the resin pipe joint 1 shown in FIGS. 1A and 1B, the resin pipe joint 11 shown in FIGS. 2A and 2B, and a straight-pipe shaped resin tube member 52a having a predetermined length, connected between these resin pipe joints 1 and 11. The piping portion shown in FIG. 4C is comprised of the two resin pipe joints 11 shown in FIGS. 2A and 2B and a straight-pipe shaped resin tube member 53 having a predetermined length, connected between the two resin pipe joints 11.

When producing piping having such a piping portion, a plurality of resin piping members such as resin pipe joints or resin tube members are used so as to form piping having a predetermined shape, in view of a space to arrange the piping or other conditions. In the recent circumstances where reduction of piping volume is desired, it is particularly necessary that a straight distance SD between two points adjacent to each other selected from the group consisting of branched points Bp, curved points Cp and inner diameter transition points Tp of the resin pipe joints of the piping is relatively short.

Here, conventionally, when a length Lh from the branched point Bp, the curved point Cp, or the inner diameter transition point Tp to the end face of the welding end portion of the resin pipe joint was too long as a joint used for a predetermined portion of piping having a predetermined shape, the end portion(s) of the resin pipe joint was cut and shortened during the production of the piping, but there was a problem that such a cutting operation remarkably deteriorated the production efficiency of the piping.

Figure 5:
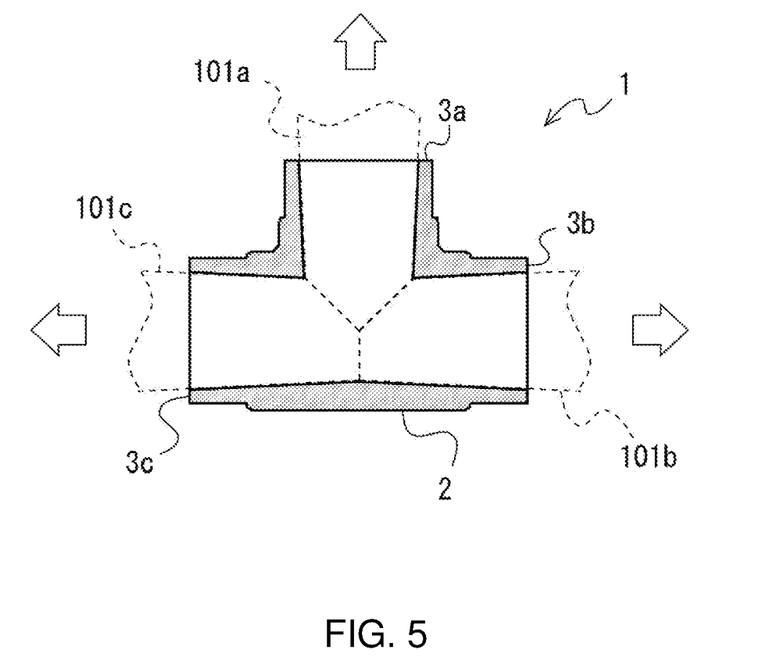
FIG. 5 is a cross-sectional view showing an arrangement embodiment of core pins when injection-molding the resin pipe joint of FIG. 1.

For example, as shown in FIG. 5, the production of the resin pipe joint 1 as a Tee can be carried out by injecting a resin in a cavity of a mold (not shown), which has a shape corresponding to the outer surface shape of the resin pipe joint 1, and curing the resin, in a state where tips of three core pins 101*a*-101*c* for forming the substantially T-shaped flow path P are arranged in a substantially T-shape so as to bring the tips of them close to one another in the cavity, as shown by the broken lines in FIG. 5. In this case, each of the core pins 101*a*-101*c* arranged in the cavity may be tapered so as to ensure a pull-out property after curing the resin, in the direction indicated by the arrows in FIG. 5. In this case, as exaggeratedly shown in FIG. 1B, the internal flow path P of the molded resin pipe joint will have a tapered shape in which the cross-sectional area of the flow path is gradually increased toward each of the welding end portions 103*a*-103*c*. Typically, the taper angle θ of the pipe inner wall surface due to the tapered shape is from approximately 0.5° to 1.0° relative to the central axis line of the internal flow path P, in the cross section shown in FIG. 5.

As described above, when the end portion of the resin pipe joint 1 is cut so as to coincide with the shape of the piping, the pipe inner diameter of the cut end portion will become smaller than the pipe inner diameter of the original end portion. Therefore, when the cut end portion is welded to an end portion of a resin tube member or the like, a step due to the difference in inner diameter is formed in the welding portion, so that a liquid pool is formed and a flow rate is reduced at the time of use. However, this invention can also be applied to any resin pipe joint in which the internal flow path is not tapered as stated above.

In this invention, in order to address such a problem, the length Lh from the branched point Bp, the curved point Cp or the inner diameter transition point Tp of the resin pipe joint 1, 11, 21 to the end face of the welding end portion 3*a*-3*c*, 13*a*, 13*b* is shorter than half of the straight distance SD between two points adjacent to each other, the two points being selected from the group consisting of the branched points Bp, curved points Cp and inner diameter transition points Tp of the piping formed using the resin pipe joints 1, 11. Here, the piping consisting of the piping portion shown in FIGS. 4A, 4B, and 4C is explained as an example. The length Lh from the branched point Bp or the curved point Cp of the resin pipe joint 1, 11 to the end face of the welding end portion 3*a*-3*c*, 13*a*, 13*b* is preferably shorter than half of the shortest straight distance SD1 (SDmin) between two points, among the straight distances SD1, SD2, SD3 between two points adjacent to each other, the two points being selected from the group consisting of the branched points Bp and the curved points Cp.

Therefore, the resin pipe joint 1, 11, 21 can be used for piping having a predetermined shape without cutting the end portion of the resin pipe joint 1, 11, 21, so that the cutting operation of the end portion, which has the problem as stated above, can be eliminated. For the shape of the predetermined piping portion in the piping, when the length Lh from each of the branched points Bp, the curved points Cp or the inner diameter transition points Tp adjacent to each other of the resin pipe joints 1, 11, 21 to the end face of the welding end portion 3*a*-3*c*, 13*a*, 13*b* is short, a straight-pipe shaped resin tube member 51, 52, 53 or the like having a suitable length may be arranged between the resin pipe joints, as shown in FIGS. 4A, 4B, and 4C. Generally, the resin tube member can be formed by extrusion molding, so that its internal flow path can have a constant cross-sectional area over its entire length. Therefore, it is possible to avoid the problems such as reduction of a flow rate due to difference in inner diameter, even if the resin tube member is cut to shorten it.

Figure 6A:
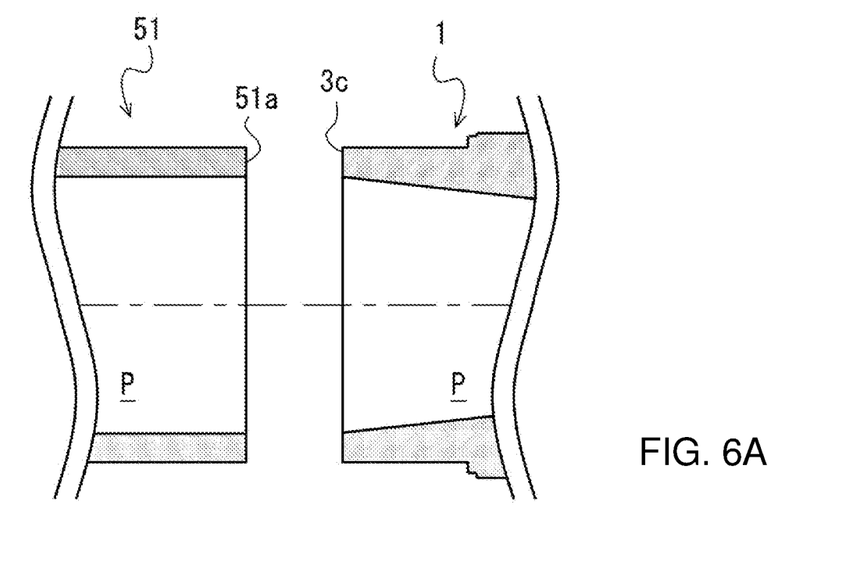
FIGS. 6A and 6B are cross-sectional views showing how an end portion of the resin pipe joint of FIGS. 1A and 1B is welded to another resin piping member.
Figure 6B:
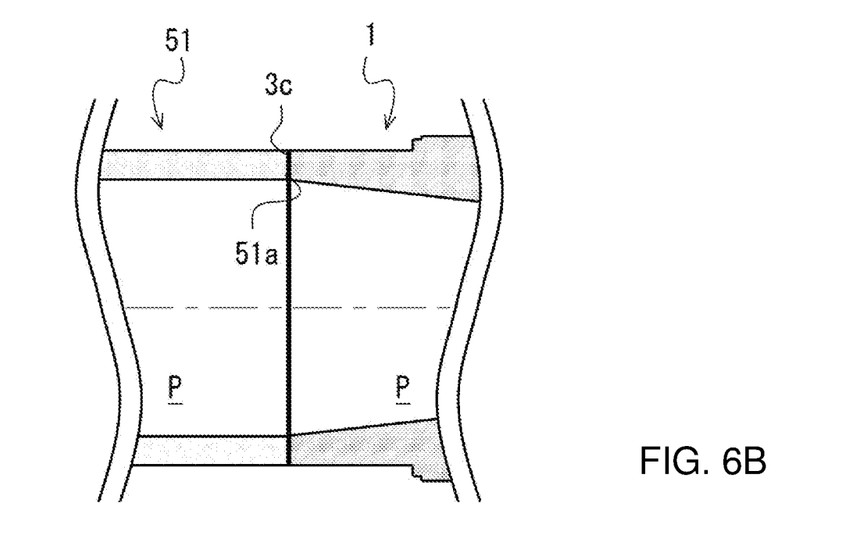

When the end portion 3*c* of the above resin pipe joint 1 or the like is welded to the end portion 51*a* of another resin piping member, for example the resin tube member 51, the end portions 3*c* and 51*a* of the resin pipe joint 1 and the resin tube member 51, which have the same inner diameter, can be abutted against and welded to each other, because it is not necessary to cut the end portion 3*c* of the resin pipe joint 1, 11, as shown in FIGS. 6A and 6B. Therefore, the problem of generating the step DL as in the conventional resin pipe joint 111 shown in FIG. 8 is not created.

Here, the branched point Bp and the curved point Cp refer to intersected points of the central axis lines of the internal flow path P, the central axis lines having extending directions different from each other, in the resin pipe joint in which the internal flow path P is branched or bent, as described above for the resin pipe joint 1, 11 as an example. Further, the inner diameter transition point Tp refers to a middle point on the central axis line C of the internal flow path P in the region A whose inner diameter changes, in the resin pipe joint in which the inner diameter of the internal flow path P changes, as described above for the resin pipe joint 21 as an example.

Further, the length Lh from the branched point Bp, the curved point Cp or the inner diameter transition point Tp to the end face of the welding end portion is measured in the direction along the central axis line of the internal flow path P in that section.

Figure 7:
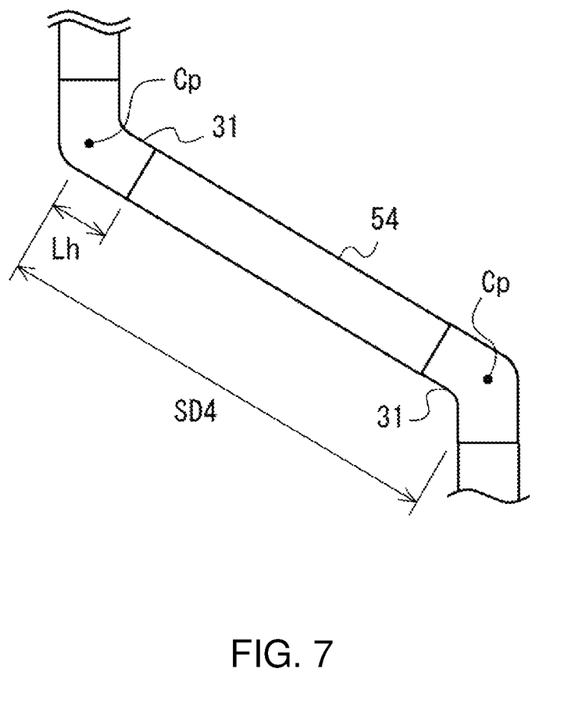
FIG. 7 is a schematic view showing another piping portion.

Further, the straight distance SD between two points adjacent to each other, the two points being selected from the group consisting of the branched points Bp, curved points Cp and inner diameter transition points Tp of the piping, means a straight distance between the branched point, curved point or inner diameter transition point of the resin pipe joint and a branched point, curved point or inner diameter transition point of other resin pipe joint adjacent to the former resin pipe joint. Therefore, for example in the piping portion illustrated in FIG. 7, the above straight distance SD between two points is the length SD4 of the line segment connecting the curved points Cp to each other, of the resin pipe joints 31 adjacent to each other. As used herein, the "two points adjacent to each other, the two points being selected from the group consisting of branched points, curved points and inner diameter transition points" refers to two points selected from the group consisting of branched points, curved points and inner diameter transition points of two resin pipe joints adjacent to each other in the pipe extending direction. Between the resin pipe joints adjacent to each other and other resin pipe joint, a straight-pipe shaped resin tube member may be present, but no further resin pipe joint is present.

When producing the piping using such resin pipe joints 1, 11, 21, it is not necessary to cut the end portions even if the resin pipe joints 1, 11, 21 are used for the portion having the shortest distance SDmin between two points of the piping.

As a result, for example in the case of the resin pipe joint 1 in which the internal flow path P is tapered, it can be connected to another resin piping member without causing the inner diameter change due to cutting of the end portion. That is, when connecting the resin pipe joint 1 to the other resin piping member, the welding end portion 3*a*, 3*b* or 3*c* of the resin pipe joint 1 and the end portion of the other resin pipe joint having the same inner diameter as that of the welding end portion 3*a*, 3*b* or 3*c* can be abutted against and welded to each other. As a result, it is possible to remove the risk of decreasing the flow rate during use and the possibility of liquid pooling due to the difference in inner diameter at the welding portion as described above. However, "the same inner diameter" as used herein does not require that the inner diameters are strictly coincident, and an inner diameter difference which can be considered to be a tolerance that will unavoidably occur during molding, such as an inner diameter difference of about 0.4 mm or less, is allowable.

In the piping according to the present invention, at least one of the two or more resin pipe joints forming the piping may be a resin pipe joint in which the length Lh is shorter than half of the straight distance SD between two points, as described above. Preferably, the two or more resin pipe joints may be resin pipe joints in which the length Lh is shorter than half of the shortest straight distance SDmin between two points. In particular, it is more preferable that the length Lh of such a resin pipe joint forming the piping is shorter than half of the shortest straight distance SDmin between two points.

On the other hand, if the length Lh from the branched point Bp, curved point Cp or inner diameter transition point Tp of the resin pipe joint 1, 11, 21 to the end face of the welding end portion 3a-3c, 13a, 13b, 23a, 23b is too short, the welding margin cannot be sufficiently ensured and the welding portion cannot be strongly welded, as well as an end portion that is not the welding end portion may be melted due to heat of a heater during welding. For example, if the length Lh is too short in the resin pipe joint 1 shown in FIG. 1, side surfaces of the other end portions 3b, 3c may be heated and melted when the end portion 3a to be welded is heated by the heater.

Therefore, the length Lh from the branched point Bp, curved point Cp or inner diameter transition point Tp of the resin pipe joint 1, 11, 21 to the end face of the welding end portion 3a-3c, 13a, 13b, 23a, 23b is preferably longer than half of the pipe outer diameter De at the portion 3a-3c, 13a, 13b, 23a, 23b.

More particularly, the ratio (Lh/De) of the length Lh from the branched point Bp, curved point Cp, or inner diameter transition point Tp to the end face of the welding end portion 3a-3c, 13a, 13b, 23a, 23b, to the pipe outer diameter De, is preferably in a range of from 0.81 to 3.90. If the ratio (Lh/De) of the length Lh to the pipe outer diameter De is less than 0.81, the welding margin cannot be sufficiently ensured as described above, or any unintended portion may be melted due to the heat of the heater during welding. On the other hand, if the ratio (Lh/De) of the length Lh to the pipe outer diameter De is larger than 3.90, the straight distance SD between the two points of the piping to be formed will be longer, so that it may be necessary to cut the end portion. From this viewpoint, the ratio (Lh/De) of the length Lh to the pipe outer diameter De may be more preferably from 0.98 to 3.23.

The length Lh from the branched point Bp, curved point Cp or inner diameter transition point Tp to the end face of the welding end portion 3a-3c, 13a, 13b, 23a, 23b may be from 12.5 mm to 25.0 mm, for example.

Although not shown, if the pipe outer diameter De is different at each of the two or more welding end portions of the resin pipe joint, the above condition of the length Lh is preferably satisfied based on the pipe outer diameter De of the largest welding end portion. Alternatively, in the resin pipe joint having the T-shaped internal flow path as shown in FIG. 1 in which the pipe outer diameter of the welding end portion at the branched portion is different from the pipe outer diameter of the welding end portion at the base portion, the length from the branched point to the end face of the welding end portion at the branched portion can satisfy the condition of the length Lh based on the pipe outer diameter of the welding end portion at the base portion, and the length from the branched point to the end face of the welding end portion at the base portion can satisfy the condition of the length Lh based on the pipe outer diameter of the welding end portion at the branched portion.

Further, in the piping formed by using the resin pipe joint 1, 11, 21, the ratio (SDmin/De) of the shortest straight distance SDmin between two points, among the straight distances SD between two points adjacent to each other, the two points being selected from the group consisting of the branched points Bp, curved points Cp and inner diameter transition points Tp, to the pipe outer diameter De at the welding end portion 3a-3c, 13a, 13b, 23a, 23b of the resin pipe joint 1, 11, 21 having the branched point Bp, curved point Cp or inner diameter transition point Tp, is preferably in a range of from 1.61 to 7.9.

If the ratio (SDmin/De) is less than 1.61, the welding margin of the resin pipe joint cannot be sufficiently obtained, and unintended portions of the resin pipe joint may be melted by the heater heat during welding. Further, if the ratio (SDmin/De) is larger than 7.9, the straight distance SD between two points of the piping to be formed may be longer.

For such reasons, the ratio (SDmin/De) may preferably be from 2.0 to 6.46.

Here, when the welding end portions of the two resin pipe joints forming the shortest straight distance SDmin between two points have different pipe outer diameters De, the above ratio (SDmin/De) can be calculated based on the outer pipe diameter De of the larger welding end portion of them.

Specifically, the shortest straight distance SDmin between two points can be from 25.0 mm to 50.0 mm.

It should be noted that in the present invention, the resin piping member includes various resin pipe joints such as the Tee shown in FIG. 1, the elbow shown in FIG. 2 and the reducer shown in FIG. 3, as well as straight-pipe shaped resin tube members extending in the straight shape, and curved-pipe shaped tubular members obtained by heating and curving the straight-pipe shaped resin tube members, and further tubular members forming the piping. Examples of materials for forming such resin piping members include perfluoroalkoxy alkane (PFA), a perfluoroethylene-propene copolymer (FEP), polyether ether ketone (PEEK) and the like, but any material other than those listed above may be used.

DESCRIPTION OF REFERENCE NUMERALS 1, 11, 21, 31 resin pipe joint
2, 12, 22 joint body portion
3a-3c, 13a, 13b, 23a, 23b welding end portion
51-54 resin tube member
51a welding end portion of resin tube member
101a-101c core pin
P internal flow path
A1-A3 opening portion of internal flow path
C1, C2 central axis line of internal flow path
Bp branched point
Cp curved point
Tp inner diameter transition point
Lh Length from branched point, curved point or inner diameter transition point to end face of welding end portion
De pipe outer diameter at welding end portion
SD, SD1-SD4 straight distance between two points adjacent to each other, selected from the group consisting of branched points, curved points and inner diameter transition points of piping
SDmin minimum straight distance between two points

What is claimed is:

1. Piping comprising:
a resin piping member having first and second welding end portions, each of the first and second welding end portions of the resin piping member having a welding end face and an opening defining an inner diameter; and
first and second resin pipe joints, each of the resin pipe joints comprising (a) a tubular body portion defining an internal flow path between first and second open ends; and (b) first and second welding end portions provided at the first and second open ends, respectively, of the tubular body portion, each of the welding end portions of each of the first and second resin pipe joints having a welding end face configured to be welded, by the application of resin melting heat and pressure, to the welding end face of one of the first and second welding end portions of the resin piping member, each of the welding end portions having an internal flow path of increasing internal diameter between one of the open ends of the tubular body portion and the welding end face;
wherein each of the internal flow paths defined by the internal body portions of the first and second resin pipe joints comprises one of (a) a branch point at which the internal flow path branches into two or more portions, (b) a curve point at which the internal flow path bends, and (c) an internal diameter transition point at which the internal diameter of the internal flow path changes;
wherein a length from the one of the branch point, the curve point, and the internal diameter transition point to the welding end face of the welding end portion of each of the first and second resin pipe joints is shorter than half of a shortest straight distance between two points in the piping including the first resin pipe joint, the resin piping member, and the second resin pipe joint, wherein one of the two points is one of a branch point, a curve point, and an internal diameter transition point in the first resin pipe joint, and the other of the two points is one of a branch point, a curve point, and an internal diameter transition point in the second resin pipe joint;
wherein the internal flow path of the welding end portion of each of the first and second resin pipe joints is defined by a tapered inner wall surface having a taper angle by which the internal flow path of each of the welding end portions increases in cross-sectional area toward the welding end face of each of the first and second resin pipe joints, whereby at least one of the welding end faces of each of the first and second resin pipe joints has an inner diameter substantially equal to the inner diameter of at least one of the welding end portions of the resin piping member; and
wherein the taper angle is from 0.5° to 1.0° relative to a central axis line of the internal flow path.

2. The piping according to claim 1, wherein the length from the one of the branch point, the curve point, and the internal diameter transition point of the first resin pipe joint to the welding end face of at least one of the first and second welding end portions of the first resin pipe joint is longer than half of an outer diameter of at least one of the first and second welding end portions of the first resin pipe joint.

3. The piping according to claim 1, wherein a ratio of the length from the one of the branch point, the curve point, and the internal diameter transition point of the first resin pipe joint to the welding end face of a first one of the first and second welding end portions of the first resin pipe joint, to an outer diameter of the first one of the first and second welding end portions of the first resin pipe joint, is within a range of from 0.81 to 3.90.

4. The piping according to claim 1, wherein a ratio of the shortest straight distance between the two points to an outer diameter of a first one of the first and second welding end portions of the first resin pipe joint is within a range of from 1.61 to 7.9.

5. A method for making piping, comprising:
(i) providing first and second resin pipe joints, each of the first and second resin pipe joints comprising:
a tubular joint body portion defining an internal fluid flow path and having at least two ends; and
a welding end portion at at least one end of the body portion, the welding end portion extending to a welding end face defining an opening, the welding end portion having an internal flow path of increasing internal diameter between the one end of the body portion and the welding end face;
wherein the internal flow path defines a flow path changing point selected from the group consisting of (a) a branch point at which the internal flow path branches into two or more portions; (b) a curve point at which the internal flow path bends; and (c) an internal diameter transition point at which the internal diameter of the internal flow path changes;
(ii) providing a resin piping member having first and second open ends and a welding end portion at each of the first and second open ends, each of the welding end portions of the resin piping member having a welding end face and an internal diameter equal to the internal diameter of the welding end faces of the first and second resin pipe joints; and
(iii) holding the welding end face of the welding end portion of the first resin pipe joint against a first one of the welding end faces of the resin piping member while applying resin melting heat and pressure to weld the welding end face of the welding end portion of the first resin pipe joint to the first one of the welding end faces of the resin piping member, and holding the welding end face of the welding end portion of the second resin pipe joint against a second one of the welding end faces of the resin piping member while applying resin melting heat and pressure to weld the welding end face of the second resin pipe joint to the second one of the welding end faces of the resin piping member, thereby connecting the first resin pipe joint, the resin piping member, and the second resin pipe joint;
wherein, after the holding and welding step, a length from the flow path changing point of the first resin pipe joint to the welding end face of the welding end portion of the first resin pipe joint is less than half of a straight distance between the flow path changing point of the first resin pipe joint and the flow path changing point of the second resin pipe joint, and a length from the flow path changing point of the second resin pipe joint to the welding end face of the welding end portion of the second resin pipe joint is less than half of the straight distance between the flow path changing point of the first resin pipe joint and the flow path changing point of the second resin pipe joint;
wherein the internal flow path of the welding end portion of each of the first and second resin pipe joints is defined by a tapered inner wall surface having a taper angle by which the internal flow path of the welding end portion of each of the first and second resin pipe joints increases in cross-sectional area toward the welding end face of each of the first and second resin pipe joints, whereby at least one of the welding end faces of each of the first and second resin pipe joints has an inner diameter substantially equal to the inner diameter of at least one of the welding end portions of the resin piping member; and wherein the taper angle is from 0.5° to 1.0° relative to a central axis line of the internal flow path.

* * * * *